United States Patent Office 3,533,167
Patented Oct. 13, 1970

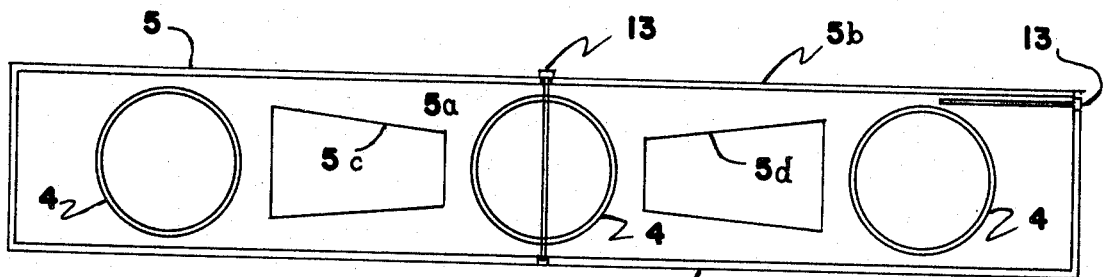
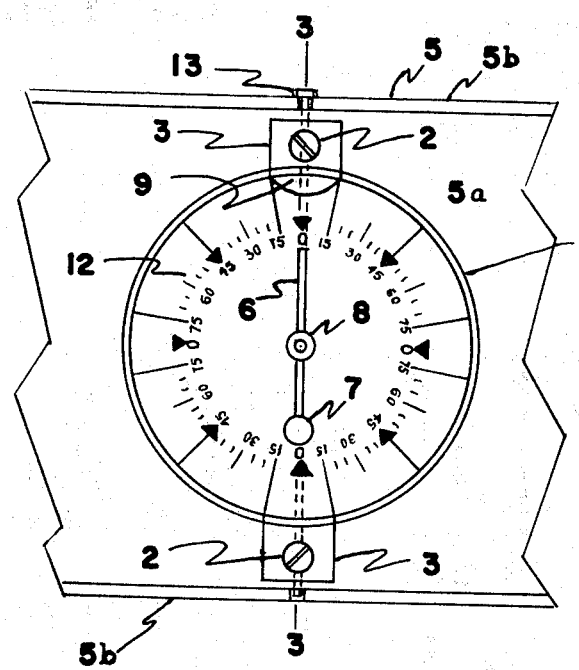
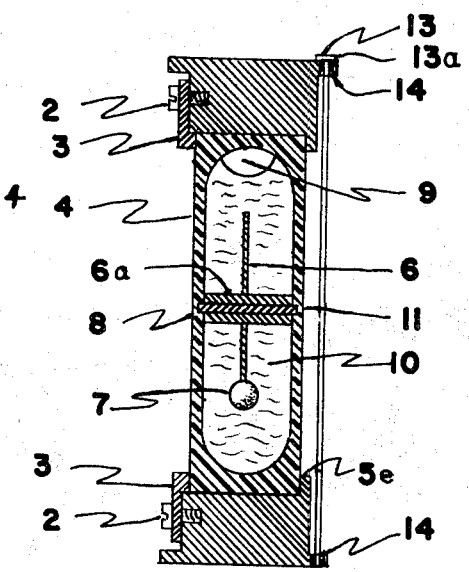

3,533,167
COMBINED SPIRIT LEVEL AND INCLINOMETER
Raymond E. Thompson, 10005 Grant Ave., Silver Spring, Md. 20910; and Paul William Thompson, 13215 Midway Ave.; and Gilbert B. Thompson, 13216 Aleutian Ave., both of Rockville, Md. 20851
Filed Aug. 13, 1968, Ser. No. 752,266
Int. Cl. G01c 9/12, 9/24
U.S. Cl. 33—210      3 Claims

ABSTRACT OF THE DISCLOSURE

A spirit level and inclinometer are structurally combined in a single unit and is provided with a plumb pin for proving. The cylindrical bubble capsule containing the liquid and inclinometer is arranged to be rotationally adjusted about its center, which is also the center of rotation of the inclinometer, to correct for any misalignment as between the capsule and the flat work-engaging surface of the device.

---

Our invention relates to an improvement in levels as typified by carpenter's and mason's spirit levels and has for its principal object to provide a combined level and inclinometer which is so constructed as to enable it to be "proved" from time to time in order to make certain that the bubble capsule is properly oriented with respect to the work-engaging surface of the level.

A further object of the invention is to provide an improved level construction which can be proved easily and quickly on the job by a self contained method, requiring no external standard or calibration source of any kind and without requiring any complicated calibration equipment.

More specifically, the improved level and inclinometer structure comprises a bubble capsule having a circular configuration which is set into the body of the level in such manner as to enable it to be adjusted rotationally about its axis. The capsule contains the usual liquid filling to establish the necessary air bubble, and also included within it is a weighted degree indicator or inclinometer which is pivoted for rotation about the axis of the capsule. A reference line preferably established by a plumbing pin, and which is preferably removable to enable it to be stored when the level is not being proved, is arranged to be mounted on the level perpendicular to a work-engaging surface of the level, the pin being aligned with the axis of the capsule to estabilsh the necessary reference line for proving. With the plumbing pin in place for proving, an observation is made of the 0° reference mark on the inclinometer scale provided on the bubble capsule. If the 0° reference mark and the plumbing pin and the indicator shaft of the inclinometer are all in alignment, the bubble capsule has the correct position of support on the level. However, if the three points of reference are not in alignment, then the bubble capsule is adjusted rotationally about its axis until a position of alignment is reached thus truing or proving the level.

The invention will be described with respect to one suitable embodiment thereof and which is illustrated in the accompanying drawings wherein:

FIG. 1 is a general view of the spirit level and inclinometer in side elevation;

FIG. 2 is an enlarged fragmentary view of the location of the bubble capsule; and FIG. 3 is a transverse sectional view taken on line 3—3 of FIG. 2.

With reference now to the drawings, the level and inclinometer is seen to be comprised of a conventionally I-shaped body 5 of any suitable material such as extruded aluminum or any other relatively light weight material which is rigid, there being a web 5a and two oppositely disposed work-engaging surfaces 5b. To lighten the weight of the level and provide hand holes, any suitable arrangement of cut-outs may be provided in the web 5a, two such cut-outs 5c and 5d being illustrated in this particular embodiment.

The bubble capsule consists of a hollow transparent cylindrical body 4 preferably of plastic which is set into a circular opening in the web 5a of the same diameter as the capsule. The rear side of the capsule seats against a circular stop flange 5e provided on the web, and is retained in place in the opening by means of two oppositely located clamping plates 3 which are fastened by screws 2 to the surface of the web. A horizontal pivot shaft 11 is located within the bubble capsule coaxially with the center of the capsule and mounted at its ends in the opposite walls of the capsule. Mounted on this shaft 11 is a degree indicator or inclinometer 6 which includes a hub portion 6a carried on the shaft and freely rotatable thereon, a degree pointer shaft 6b carried by the hub, and a gravity weight 7 located below the pivot shaft 11 so that the shaft 6b always points vertically upward. Associated with the upper end of the pointer shaft 6b is an inclinometer scale 12 provided on one or both faces of the bubble capsule, the scale being of the quadrant type with a 0° reference point at each quadrant and other scale markings graduated from 0° up to 90° in each quadrant. The interior of the bubble capsule 4 is nearly filled with liquid 10 so as to establish an air bubble 9 at the upper portion of the capsule. In the illustrated embodiment, the bubble 9 is seen to have a length covering 30° on the inclinometer scale, i.e. 15° to each side of the upper 0° mark on the scale. The liquid filling also serves to damp movement of the inclinometer element 6.

As previously explained, the major object of the present invention is to provide a novel arrangement for proving, i.e. checking the accuracy of the level on the job. For this purpose a plumb pin 13 is provided. This pin 13 is preferably stored within the body of the level while working with the level so as to be out of the way, and in the present embodiment this storage is provided by a drilled bore in one end face of the level in which the pin is inserted up to its head, as illustrated in FIG. 1. To prove the level, plumb pin 13 is removed from its storage bore and relocated to the position indicated in FIGS. 2 and 3. This proving position is also indicated in FIG. 1. In the proving position, the longitudinal axis of plumb pin 13 is perpendicular to the two flat work-engaging surfaces 5b of the level, and the pin axis passes through the axis of rotation of the inclinometer pointer shaft 6b. In order to establish this requisite position of the plumb pin, it will be seen that two locating holes 14 are provided respectively in flange portions of the two work-engaging surfaces 5b, the pin 13 being received in these holes and held there by the pin head 13a which contacts the upper working engaging surface.

In order now to check the accuracy of the level, plumb pin 13 is brought into alignment with the inclinometer pointer shaft 6b. If the bubble capsule 4 is in its correct position relative to the work-engaging surface 5b, the 0° mark on the inclinometer scale on the face of the capsule will also be in alignment with the end of the pointer shaft 6b thus placing the air bubble 9 correctly between the two 15° scale marks located to each side of the 0° reference mark. If the bubble capsule 4 is not in its correct position, rotationally speaking, with respect to the work-engaging surface 5b, the 0° mark on the scale will not be in alignment with the inclinometer pointer and plumb pin. The necessary correction in the position of the bubble capsule can then be made by loosening the screws 2 which loosen the clamping plates 3 thus enabling the capsule to be shifted rotationally until the 0° scale mark comes into alignment with the inclinometer pointer 6b and plumb pin 13, after which the screws 2 are re-tightened.

In conclusion, it will thus be seen that the improved level structure not only enables the level to be proved on the job with respect to its accuracy, but also provides for either plumb, level or degree of angle registrations. Also, the level may be provided with one or several bubble capsules mounted in spaced relation along its length. In the illustrated embodiment, FIG. 1, three such capsules are provided, it being necessary, however, that only one capsule such as the center one be associated with the plumb pin 13. After this center capsule has been proved in accordance with the procedure which has been described, the remaining ones may be accurately reset, if out of adjustment, to bring the 0° scale mark in alignment with the inclinometer pointer shaft 6b.

We claim:

1. In a device providing a combined inclinometer and spirit level, the combination comprising an elongated support body having a longitudinally extending flat work-engaging surface, a transparent cylindrical bubble capsule, means mounting said capsule within an opening through said support body for rotational adjustment about its center, releasable means for clamping said capsule in a desired position of adjustment on said support body, said capsule being essentially filled with a liquid to establish an air bubble therein, an arcuate degree scale provided on at least one face of said capsule concentric with the capsule center and which is positioned at the air bubble, a weighted inclinometer element including a pointer shaft mounted within said capsule for rotation about an axis coincident with the capsule center, a plumb pin for proving the device, and means for removably mounting said plumb pin on said support body perpendicular to said work-engaging surface, said plumb pin extending across a diameter of said capsule so as to coincide with the axis of rotation of said pointer shaft and being visible from one side of said transparent capsule through said scale and air bubble, said device being proved by bringing said pointer shaft into alignment with said plumb pin and then rotating said capsule until the 0° mark on said scale is located at the center of the air bubble thereby accurately aligning the air bubble with said flat work-engaging surface.

2. A combined inclinometer and spirit level device as defined in claim 1 wherein said means for mounting said means for mounting said plumb pin in the proving position comprises a pair of aligned bores provided in oppositely located work-engaging surfaces of the device.

3. A combined inclinometer and spirit level device as defined in claim 1 wherein said cylindrical bubble capsule is located in a cylindrical recess in the support body, the rear side of said capsule seating against a circular flange, and wherein said releasable means for clamping said capsule comprises at least one releasable clamping plate in contact with the front side of said capsule for pressing said capsule into firm contact with said circular flange.

References Cited
UNITED STATES PATENTS

| | | | |
|---|---|---|---|
| 786,269 | 4/1905 | Curry | 33—211 |
| 1,162,018 | 11/1915 | Bevacqua | 33—210 |
| 1,464,467 | 8/1928 | Crisp | 33—218 |
| 2,287,863 | 6/1942 | Buckley | 33—213 |

LEONARD FORMAN, Primary Examiner

D. A. DEARING, Assistant Examiner